United States Patent Office 3,536,375
Patented Oct. 27, 1970

3,536,375
LIGHT BEAM DEFLECTOR SYSTEM
John Revere Mansell, East Grinstead, England, assignor, by mesne assignments, to U.S. Philips Corporation, New York, N.Y., a corporation of Delaware
Filed Jan. 29, 1968, Ser. No. 701,348
Claims priority, application Great Britain, Jan. 30, 1967, 4,420/67
Int. Cl. G02f 1/24
U.S. Cl. 350—157  5 Claims

ABSTRACT OF THE DISCLOSURE

A deflection system for a polarized radiation beam is described. It comprises first and second birefringent crystals having principal axes at right angles to one another. The crystals define an interface, and the beam of radiation is incident on the interface at an angle of incidence greater than the critical angle for radiation polarized in a plane at right angles to its plane of incidence but smaller than the critical angle for the radiation polarized in the plane.

---

The invention relates to a system for deflecting a polarized beam of radiation, which system includes a birefringent crystal having an interface on which the radiation which has entered the crystal falls at an angle of incidence which is greater than the critical angle for radiation polarized in a plane at right angles to the plane of incidence of the beam at the interface and which is smaller than the critical angle for radiation polarized in a plane coinciding with the plane of incidence of the beam at the interface.

Such a system is known from French Pat. 1,445,758. In accordance with the direction of polarization of the radiation entering the crystal this radiation will either be reflected at, or pass substantially without attenuation through, the interface between the crystal and the ambient atmosphere. This known system suffers from the disadvantage that the angle of incidence on the interface can be varied only within comparatively narrow limits, that is to say between angles $\alpha$ and $\beta$, where $$\sin \alpha = \frac{1}{n_o} \text{ and } \sin \beta = \frac{1}{n_e}$$

In these expressions $n_o$ is index of refraction of the crystal for the ordinary rays and $n_e$ is the index of refraction of the crystal for the extraordinary rays.

It is an object of the invention to provide a system enabling the angle of incidence on the interface to be varied within compartively wide limits. To this end, a system according to the invention is characterized in that the interface coincides at least substantially with the interface of a second birefringent crystal of the same material, the arrangement being such that equal principal axes of the two crystals are at right angles to one another.

Thus, the angle of incidence on the interface can be varied through an angle equal to $$90° - \gamma \left( \sin \gamma = \frac{n_e}{n_o} \right)$$

According to a further feature, the crystals are separated by a layer of a bounding material having an index of refraction equal or substantially equal to one of the two indices of refraction of the crystals. This provides a compact strong construction.

Advantageously the respective principal axis of the first crystal is chosen so as to be parallel to the direction of the incident radiation.

The deflector system may be of the type in which the crystals are negative uniaxial ones and the said principal axis is the optic axis.

Alternatively, the deflector system may be of the type in which the crystals are positive uniaxial ones and the said principal axis is the optic axis, the second crystal having said axis parallel to the direction of the incident radiation (see FIG. 3B).

Finally, according to a modification of the invention, the crystals may be biaxial ones, in which case three different refractive indices occur instead of two (see FIG. 3C).

The emergence face of the first crystal may be at right angles to the entrance face, in which case a separate external mirror (parallel to the interface) can be used to redirect the reflected beam into a displaced path parallel to the direction of the incident radiation. Preferably, however, this function is performed by total internal reflection within the first crystal, for which purpose the latter has an emergence face parallel to its entrance face and a fourth operative face parallel to the interface. In such an arrangement its emergence face can be coplanar with the emergence face of the second crystal, and this is the configuration chosen for the examples illustrated and described hereinafter with reference to the accompanying diagrammatic drawings, in which:

Figure 1:
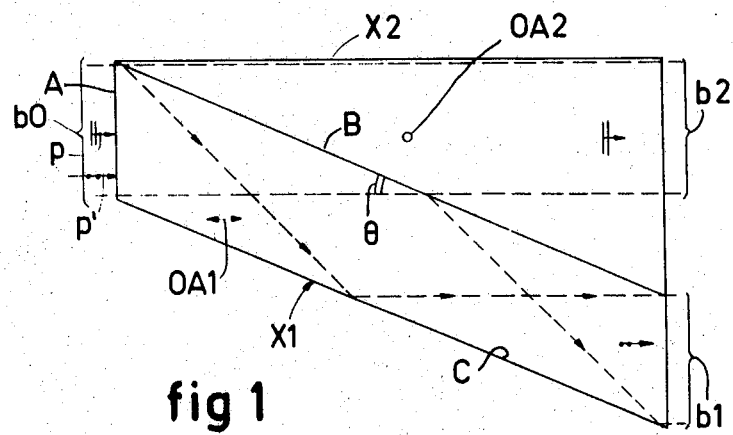
FIGS. 1 and 3A show negative uniaxial crystal arrangements.
Figure 2:
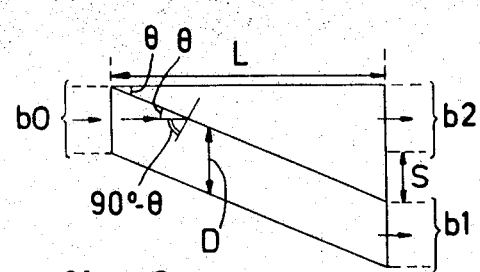
FIG. 2 illustrates certain angles and parameters of the system.

In FIGS. 1 and 2 a beam of radiation $b0$ enters an entrance face A. The beam is polarized either in the plane of the drawing (beam P) or at right angles thereto (beam P').

Initially it will be assumed, for simplicity, that the first crystal X1 and the second crystal X2 are so accurately cut that they are in direct contact with each other at their interface B without the need for optically matched bonding material.

The entrance path of the beam is shown horizontal and intersects the interface B at an angle $\theta$ (FIGS. 1 and 2) which gives an angle of incidence $(90° - \theta)$ at the interface (FIG. 2). The angle between the interface B and the upper face of the crystal X2 also happens to be equal to $\theta$ because that upper face has been chosen to be parallel to the direction of the entering radiation, but this is not significant.

As will be explained, if the beam $b0$ has a polarization P it will pass through B and emerge from the second emergence face as an emergent beam $b2$, whereas with the polarization P' it will be totally or substantially totally reflected in the crystal X1 so that it emerges as an emergent beam $b1$.

The deflector shown in FIG. 1 comprises two pieces (X1 and X2) of calcite (negative uniaxial) with their optic axes OA1 and OA2 at right angles to one another. For a radiation beam $b0$ incident at right angles on the face A and thus travelling through the first crystal (X1) in a direction parallel to its optic axis OA1, the refractive index is equal to the ordinary reflective index $n_o$ irrespective of the direction of polarization of the beam. A beam which is polarized in the plane of the figure will experience no change in refractive index at the interface B between the two crystals and will pass through the second crystal (X2) and emerge undeflected at $b2$. A beam polarized at right angles to the plane of the drawing, however, will experience a change in refractive index at the interface B, since the refractive index in the second crystal is that of the extraordinary ray ($n_e$). Now if the angle of incidence at the interface is greater than the critical angle $\alpha_o$ given by $$\sin \alpha_o = \frac{n_e}{n_o} \ (n_e < n_o)$$

then the radiation will be totally reflected at the interface B. After further total internal reflection at the face C the beam will emerge at $b1$ parallel to the incident beam but displaced. The degree of displacement will depend on the separation of the two inclined faces of the first crystal.

The minimum separation (S in FIG. 2) can be shown to be $$S = D \cos 2\theta$$

and the length of the deflector (L in FIG. 2) will then be $$L = 2D \cos^2 \theta \cot \theta$$

For radiation in the visible region the critical angle varies between 63° and 64° for calcite (see the table below) so that an angle of incidence (90°−$\theta$) of 67° ($\theta = 23°$) allows a reasonable aperture for the device. (Thus, for example, a deflector with $\theta = 23°$ and $D = 5$ mm. will have a separation S of 3.5 mm. and a length L of 20 mm.).

TABLE

| Wavelength in μm. | $n_o$ | $n_e$ | $\alpha_o$ |
|---|---|---|---|
| 0.3403 | 1.701 | 1.506 | 62°18′ |
| 0.4340 (violet) | 1.675 | 1.494 | 63°7′ |
| 0.5460 (green) | 1.662 | 1.488 | 63°33′ |
| 0.5892 | 1.658 | 1.486 | 63°41′ |
| 0.6562 (red) | 1.654 | 1.485 | 63°52′ |
| 0.7665 | 1.652 | 1.484 | 63°56′ |

The two crystals have to be in optical contact (which is difficult to arrange) or cemented together with an adhesive having a refractive index equal or close to $n_o$. In the latter case the total reflection takes place at the interface between the cement and the second crystal.

In a practical application the device is preceded by an electro-optical switch whose purpose is to effectively rotate the plane of polarization of the entering beam $b0$ through 90°, thereby switching the output beam from one position to the other. (In the case of an incidence beam $b0$ having a direction of polarization different from the two specified directions, radiation would emerge from both positions; the relative intensities would be depend on the magnitude of the components of the beam with polarizations in the two directions.)

Figure 3A:
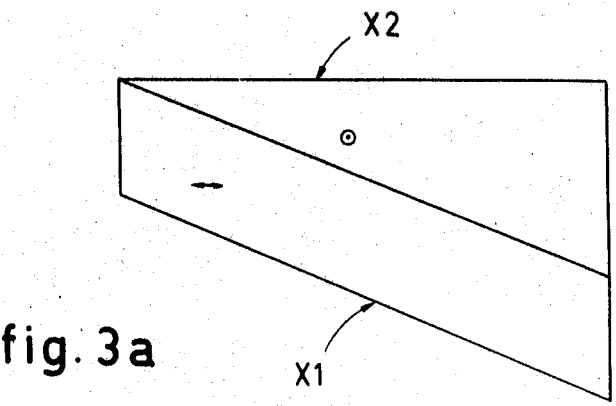
Figure 3B:
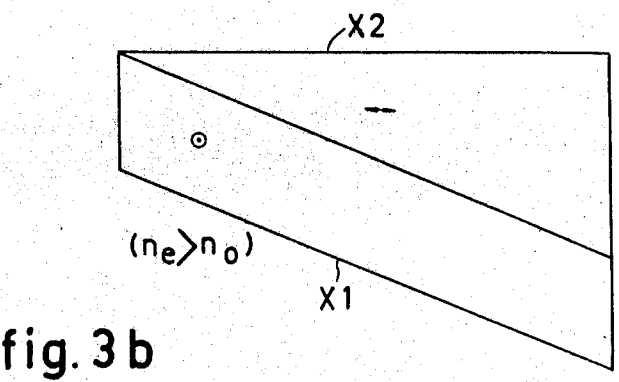
FIG. 3B shows a positive uniaxial crystal arrangement.

The device may be constructed from other uniaxial crystals having widely separated refractive indices $n_o$ and $n_e$ with an appropriate choice of $\theta$ and, instead of being negative uniaxial crystals as in the above case of calcite, the crystals may be positive uniaxial crystals ($n_e > n_o$), in which case the directions of the optic axes are changed by 90°, as indicated in FIG. 3B (FIGS. 3A and 3B give a schematic comparison of the two cases).

Figures 3, 3C:
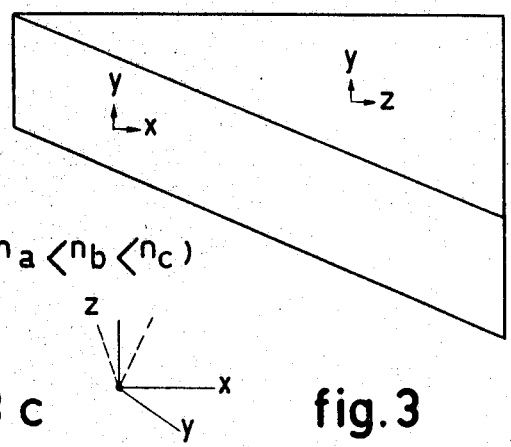
FIG. 3C illustrates a modification of the invention employing biaxial crystals.

A third case is possible as a modification using biaxial crystals and is shown schematically in FIG. 3C.

Figure 4:
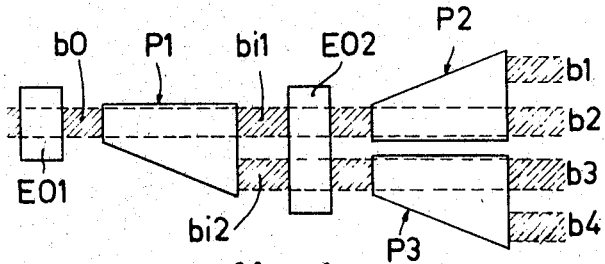
FIG. 4 shows an assembly of three deflector systems with appropriate electro-optical switching devices for routing a beam of radiation to any one of four emergence paths.

More complex arrangements may be constructed for the purpose of switching a beam between more than two paths. Thus, for example, FIG. 4 shows a "tree" arrangement suitable for use in a colour television display system. It employs three devices P1, P2 and P3 each of which may be of the type described with reference to any of FIGS. 1, 2 and 3. The first device (P1) switches the input beam $b0$ to one two intermediate paths $bi1$ and $bi2$. The devices P2 and P3 are arranged "back-to-back" in line with paths $bi1$ and $bi2$ respectively and they provide, together, four possible output paths ($b1$, $b2$, $b3$ and $b4$) each of which can be selected by appropriately controlling electro-optical switches EO1 and EO2 in known manner. Such switches are used for the purpose of effectively rotating the plane of polarization through 90° to switch the beam from one position to the other. These switches may, for example, be Kerr cells or they may be devices based on the Pockels effect and made of, say, ADP (ammonium dihydrogen phosphate) or KDP (potassium dihydrogen phosphate).

In FIG. 3C a biaxial crystal has three axes $x$, $y$ and $z$ at right angles to one another and three refractive indices $n_a$, $n_b$ and $n_c$ corresponding respectively to said axes. These indices have the relationship $$n_a < n_b < n_c$$

and it is known that, as a consequence, the optic axes lie in the x–z plane. (In the figure the axis $y$ is at right angles to the plane of the drawing and is shown in perspective.)

In the arrangement of FIG. 3C (which is one of three possible arrangements of the axes) the refractive index for radiation polarized in the plane of the drawing in both crystals is equal to $n_b$. This radiation is not deflected. For radiation polarized in a plane at right angles to the plane of drawing the refractive index changes from $n_c$ to $n_a$ at the interface. If the angle of incidence on the interface is greater than the critical angle given by sin $\alpha_o = n_a : n_c$, then the light will be totally internally reflected.

Although the arrangement of FIG. 3C is a modification of the invention in that it involves three (instead two) values of $n$, it falls (with the other embodiments) within a general definition which can be given on the basis of three directions D1, D2 and D3 at right angles to one another, which correspond respectively to the direction $x$, $y$ and $z$ of FIG. 3C.

In fact, in all the embodiments the system comprises a first birefringent crystal and a second crystal of the same material, with a principal axis in the first crystal at right angles to the same principal axis in the second crystal, each axis being parallel to either D1 or D3 in such a manner that for an incident beam polarized in a direction parallel to D2 both crystals have the same refractive index, whereas for a second beam polarized in a direction parallel to D3 the refractive index at the interface changes from a high value to a low value. The angle of incidence of the beam at the interface is in all cases greater than the critical angle $\alpha_o$ for the second beam, and this critical angle is defined as:

$$\sin \alpha_o = \frac{n_1}{n_2}$$

where $n_1$ and $n_2$ are the refractive indices in the second and first crystals respectively.

What is claimed is:

1. A system for deflecting a polarized beam of radiation comprising first and second birefringent crystals forming an interface; said first crystal having an entrance face, a first surface forming the interface with the second crystal, a second surface parallel to the first surface, an exit face opposite to the entrance face, and a principal axis in a given direction parallel to the direction of incident radiation; said second crystal having a surface forming an interface with the first crystal, an exit face parallel to the exit face of the first crystal, and being of the same material as the first crystal but oriented such that its principal axis is at right angles to said given direction; means for directing a polarized radiation beam at the entrance face of said first crystal such that the beam enters the first crystal and is incident on the interface at an angle of incidence greater than the critical angle for radiation polarized in a plane at right angles to the plane of incidence of the beam at the interface but smaller than the critical angle for radiation polarized in a plane in the plane of incidence of the beam at the interface; and means in the path of the polarized beam for effectively rotating its plane of polarization.

2. A system as set forth in claim 1 wherein the first and second crystals are separated at the interface by a layer of bonding material having a refractive index substantially equal to one of the refractive indices of the crystals.

3. A system for deflecting a polarized beam of radiation comprising first and second birefringent crystals forming an interface; said first crystal being a positive uniaxial crystal and having an entrance face, a first surface forming the interface with the second crystal, an exit face, and a principal axis in a given direction; said second crystal being a positive uniaxial crystal and having a surface forming an interface with the first crystal, an exit face, and being of the same material as the first crystal but oriented such that its principal axis is at right angles to said given direction; means for directing a polarized radiation beam at the entrance face of said first crystal such that the beam enters the first crystal travelling in a direction parallel to the direction of the principal axis in the second crystal and is incident on the interface at an angle of incidence greater than the critical angle for radiation polarized in a plane at right angles to the plane of incidence of the beam at the interface; and means in the path of the polarized beam for effectively rotating its plane of polarization.

4. A system as claimed in claim 3 wherein the exit faces of the first and second crystals are co-planar.

5. A system for deflecting a polarized beam of radiation comprising first and second birefringent crystals forming an interface; said first crystal having an entrance face, a first surface forming the interface with the second crystal, a second surface parallel to the first surface, an exit face opposite to the entrance face, and a principal axis in a given direction perpendicular to the direction of incident radiation; said second crystal having a surface forming an interface with the first crystal, an exit face parallel to the exit face of the first crystal, and being of the same material as the first crystal but oriented such that its principal axis is at right angles to said given direction; means for directing a polarized radiation beam at the entrance face of said first crystal such that the beam enters the first crystal and is incident on the interface at an angle of incidence greater than the critical angle for radiation polarized in a plane at right angles to the plane of incidence of the beam at the interface but smaller than the critical angle for radiation polarized in a plane in the plane of incidence of the beam at the interface; and means in the path of the polarized beam for effectively rotating its plane of polarization.

References Cited
FOREIGN PATENTS 398,100 9/1933 Great Britain.
918,102 10/1946 France.

DAVID SCHONBERG, Primary Examiner

M. J. TOKAR, Assistant Examiner

U.S. Cl. X.R.
350—266